US010750689B2

(12) United States Patent
Olesen et al.

(10) Patent No.: US 10,750,689 B2
(45) Date of Patent: Aug. 25, 2020

(54) AUTOMATED HYDROPONIC GROWING APPLIANCE

(71) Applicant: Babylon Micro-Farms Inc., Charlottesville, VA (US)

(72) Inventors: Alexander Olesen, Charlottesville, VA (US); Graham Smith, Charlottesville, VA (US); Sam Korn, Charlottesville, VA (US)

(73) Assignee: Babylon Micro-Farms Inc., Charlottesville, VA (US)

( * ) Notice: Subject to any disclaimer, the term of this patent is extended or adjusted under 35 U.S.C. 154(b) by 0 days.

(21) Appl. No.: 16/100,795

(22) Filed: Aug. 10, 2018

(65) Prior Publication Data

US 2019/0075741 A1    Mar. 14, 2019

Related U.S. Application Data

(60) Provisional application No. 62/555,777, filed on Sep. 8, 2017.

(51) Int. Cl.
*A01G 31/02* (2006.01)
*A01G 31/06* (2006.01)
(Continued)

(52) U.S. Cl.
CPC ............ *A01G 31/02* (2013.01); *A01G 27/001* (2013.01); *A01G 27/003* (2013.01); *A01G 31/06* (2013.01); *A01G 2031/006* (2013.01)

(58) Field of Classification Search
CPC .. A01G 31/02; A01G 31/06; A01G 2031/006; A01G 27/003; A01G 27/001; A01G 27/005; A01G 27/006; A01G 27/02
See application file for complete search history.

(56) References Cited

U.S. PATENT DOCUMENTS

| 5,598,663 A | 2/1997 | Kikuchi |
| 6,061,957 A | 5/2000 | Takashima |

(Continued)

FOREIGN PATENT DOCUMENTS

WO    2012072273 A1    6/2012

OTHER PUBLICATIONS https://hannainst.com/advanced-fertilizer-injection-system.html (6 pages).
PCT Search Report and Written Opinion (15 pages).

*Primary Examiner* — Trinh T Nguyen
(74) *Attorney, Agent, or Firm* — Woods Rogers PLC; Nathan A. Evans

(57) ABSTRACT

This invention is a hydroponic appliance that allows users to grow sufficient yields of fresh produce with relatively little maintenance. The appliance incorporates multiple features required for hydroponic plant cultivation into a plug-and-play system with a feedback loop to manage optimal growing conditions, comprising a growing area, a processor, a mixing chamber, and, in embodiments, more than one reservoir. In aspects, the grow area is divided between two or more reservoirs allowing users to stratify their crops or plant different crop types simultaneously. The apparatus and associated method provide the overall system with increased versatility, including removing aspects of day-to-day maintenance. The system automatically regulates the environment in response to various sensor readings. This includes automatically regulating the temperature, humidity, carbon dioxide level, pH level, and/or nutrient concentration. Accordingly, the plants have more optimum conditions for growth. The system utilizes, for example, pre-seeded trays, a single mixing chamber, a processor, and a plurality of reservoirs.

23 Claims, 12 Drawing Sheets

(51) Int. Cl.
*A01G 27/00* (2006.01)
*A01G 31/00* (2018.01)

(56) References Cited

U.S. PATENT DOCUMENTS

| | | |
|---|---|---|
| 2014/0259920 A1 | 9/2014 | Wilson |
| 2016/0050862 A1 | 2/2016 | Walliser |
| 2016/0316646 A1* | 11/2016 | Lepp .................... A01G 7/045 |
| 2016/0345517 A1 | 12/2016 | Cohen et al. |
| 2017/0013810 A1* | 1/2017 | Grabell .................. A01G 31/06 |
| 2017/0105373 A1 | 4/2017 | Byron, III et al. |
| 2017/0208757 A1 | 7/2017 | Valmont |
| 2018/0325038 A1* | 11/2018 | Spiro ..................... A01G 31/06 |
| 2019/0124866 A1* | 5/2019 | Maxwell ................ A01G 31/06 |
| 2019/0183062 A1* | 6/2019 | Pham .................... A01G 9/0297 |
| 2019/0254243 A1* | 8/2019 | Friesen ................. A01G 31/02 |
| 2019/0335692 A1* | 11/2019 | Speetjens ................ F03B 7/00 |

* cited by examiner

- Guided Growing Experience
  8010

- Remote Crop Monitoring
  8020

- Live Plant Growth Analytics
  8030

- Recipe Suggestions
  8040

- Re-stock Plants Instantly
  8050

12030 ations.

AUTOMATED HYDROPONIC GROWING APPLIANCE

CROSS-REFERENCE TO RELATED APPLICATIONS

The present application relies on the disclosures of and claims priority to and the benefit of the filing date of U.S. Appl. No. 62/555,777 filed Sep. 8, 2017.

BACKGROUND OF THE INVENTION

Field of Invention

The present invention is directed in general aspects to the intersection of hydroponic plant cultivation, urban farming, indoor gardening, and consumer electronics. In a preferred embodiment, the current invention provides for devices, apparatus, and related methods, which allow users to grow a wide variety of crops in a plug-and-play, dynamic feedback control hydroponic system utilizing a novel technology platform requiring relatively little maintenance compared to prior art systems, other than introducing pre-seeded growing trays, in aspects, and then harvesting. The invention, in aspects, enables users that have little or almost no experience with crop cultivation to grow sufficient yields of crops in a small area, regardless of the environment. This novel hydroponic system incorporates innovative technology that, in part, automatically regulates the environment of the compact growing system depending on feedback from sensors detecting real-time growing conditions at the crop, pre-seeded tray, in a mixing apparatus, in a reservoir, or based on overall system levels.

Description of Related Art

The hydroponic method of cultivating plants involves growing plants in a soil-less culture. In order to achieve sufficient yield without soil, hydroponic cultivation uses a liquid solution comprising water and various nutrients. In most cases, this method allows plants to grow faster, healthier, and more disease-free than when growing in soil.

There are six basic categories of hydroponic systems: Wick, Raft (also called Water Culture), Ebb and Flow (also called Flood & Drain), Drip, Nutrient Film Technique, and Aeroponic. These basic system categories include multiple variations, and almost all hydroponic systems are a variation or combination of these types of systems.

Optimal plant growth depends on, among other things, a proper balance of light, water, nutrients, carbon dioxide, humidity, temperature, and time, and the most effective hydroponic cultivation is dependent on careful regulation of these several factors. The problems with most prior art consumer-focused hydroponic systems are based on the complexities of system components, a requirement for highly technical measurements, onerous maintenance, versatility, complicated design, or some combination of these elements. (On the other hand, relatively unsophisticated technology incapable of performing the functionality of the current invention is another drawback to currently available systems.) Moreover, most commercially available systems require an extensive list of components sourced from multiple retailers. This provides a challenge for consumers, and therefore a barrier to entry, due to the extensive set-up time and lack of clarity surrounding what components are best suited to an individual's growing needs or desires. The current invention provides a plug-and-play growing apparatus, which simplifies the system and process, while still providing for sufficient or enhanced crop yield. Additionally, the current invention provides for, in preferred embodiments, a single "doser," sometimes referred to herein as a "multi-doser," "mixing chamber," "dosing chamber," or some variant thereof, which is capable of dosing a plurality of plants, growing areas, and/or reservoirs with proper amounts of water and nutrients, whereas the prior art teaches dosers that service only a single growing area, such as a single tray, pod, plant, or reservoir. Consequently, the present invention allows, for example, a user to introduce a pre-seeded growing pod, tray, table, or shelf, and the system will take care of managing the plant growth lifecycle, in part based on the very growing conditions present for that plant, which the system will continually or periodically maintain at optimal, near-optimal, pre-determined, and/or desired conditions.

More specifically, the measuring of pH, electrical conductivity, temperature, and other variables often require individual devices to take time consuming and complex readings. These readings require scientific knowledge that makes hydroponics inaccessible to most consumers, which is resolved by the present invention. Moreover, most consumer hydroponics systems are limited in what they can grow; for example, they tend to be specialized for one crop type, or too small to accommodate larger plants. Current hydroponic systems also require users to select different growth mediums to fit plastic mesh cups and then plant seeds separately. As described herein, the current invention resolves such complications, especially for entry-level consumers, providing for a more user-friendly system allowing for more widespread use of hydroponics among both novice and experienced growers.

SUMMARY OF THE INVENTION

In one embodiment of the current invention, a computerized core control system comprising a processor is provided that automatically takes, monitors, and/or processes necessary readings and, based on those readings and relevant feedback, makes the necessary adjustments to ensure optimum, near optimum, and/or desired growing conditions without direct intervention being taken by the user. While the prior art requires maintenance of hydroponic systems depending on the technical measurements and therefore typically requires extensive day-to-day work for users, this invention removes or nearly removes the necessity for day-to-day maintenance by automatically adjusting growing conditions in real- or near real-time.

In a preferred embodiment, the system also comprises a multi-dosing device allowing for the maintenance of multiple nutrient reservoirs, using a single set of sensors and nutrient injectors associated with the multi-doser. The multi-doser, as taught herein, automates nutrient dosing and pH adjustment for multiple growing zones, including the ability to nourish different types of plants and/or at different stages of the plant lifecycle, with, in one embodiment, a single multi-doser device for the overall system. Whereas in most automated dosing systems the sensors and dosers are located directly in the reservoirs that hold water, the current invention provides for, in a preferred embodiment, a single sensing and dosing chamber for the overall hydroponic system. For example, when a pH and nutrient content of a reservoir must be checked, the system pumps water or other liquid from that reservoir, or from a separate water or other liquid tank, into a common mixing chamber and back to its reservoir, where it is then pumped back to the plant. As it circulates, it immerses the sensors in the dosing or mixing chamber. Based on data recorded by the sensors, the device doses nutrient and pH solution directly into the mixing chamber. The circulation mixes the solution and the sensors monitor the water and instruct the pumps when the desired nutrient concentration or pH has been achieved. This process is repeated until the pH and nutrient concentration is in line with a pre-programmed growth recipe for a given reservoir. The system then circulates the solution from the next reservoir in the same fashion, sensing, mixing, and repeating until the values reach the growth recipe for that independent reservoir. The system cycles through and corrects or optimizes the reservoirs on a periodic basis; this process can be repeated as frequently as a user desires, or as determined by the processor, to maintain optimum or near optimum conditions within the nutrient solution for any given crop.

In another preferred embodiment, the multi-doser provides for a system allowing a feedback loop, whereby information about optimal growing conditions for the crop, coupled with information about the actual, real- or near real-time measurements of the crop's growing conditions, is used to instruct the multi-doser device, using sensors in the multi-doser, to mix a desired nutrient concentration and/or pH for the reservoir for that crop. Such optimal growth recipe is then used to dose that particular crop. Information about that crop's growing conditions are periodically measured and the feedback loop of measuring growing conditions, mixing an optimal growth medium for the plant based on the growing conditions, and supplying the plant with the growth medium, continues until harvest. In certain embodiments, measured growing conditions data is sent to a core control system computing processor that compares the current growing conditions against optimal or desired growing conditions, and instructs the mixing chamber to mix a solution to send to the plant that will attempt to bring the growing conditions more closely in line with optimal or desired growing conditions according to the core control system.

This dynamic feedback control system allows for a single mixing/dosing chamber to supply more than one reservoir, which in turn means the overall system can more efficiently service more than one growing area, plant, plant type, pod, tray, table, or other apparatus containing plants. Therefore, a more compact, space-efficient, or resourceful system can be enabled, such as a cabinet containing growing trays or tables stacked vertically and/or horizontally, as shown in, for example, FIG. 9.

In another embodiment, the invention comprises an adjustable grow area that allows for smaller crops to be densely packed or, alternatively, for larger plants to be spaced out. As a result, the system allows for a more complete and versatile growing system enabling users to grow a wider variety of plant types without the need for changing the underlying growing apparatus. The system is designed to offer users a comprehensive, indoor growing appliance that has versatile growing capabilities and requires less maintenance than other consumer-level hydroponic systems.

This invention is also designed to simplify the growing process utilizing a more simple and functional home appliance. For example, the system comprises customized growing sheets or trays (or in some cases, pods) that are tailored to fit into the system, and these trays contain, in aspects, seeds and an inert growth medium. The trays simplify the growing process for users, allowing them to introduce trays of selected plant types or varying plant types and wait for harvest, while the system automatically compensates for differing growing needs of different trays so that plants with different nutrient requirements and other optimal growing conditions can grow in the same system, at the same time. In embodiments, the trays may be recognized by the system based on quick response codes (or QR codes), bar codes, or any other mechanism for recognizing an apparatus based on a predetermined code, pattern, or other passive or active communication method.

BRIEF DESCRIPTION OF THE DRAWINGS

The accompanying drawings illustrate certain aspects of embodiments of the present invention and should not be used to limit the invention. Together with the written description the drawings serve to explain certain principles of the invention.

DETAILED DESCRIPTION OF VARIOUS EMBODIMENTS OF THE INVENTION

Figure 1:
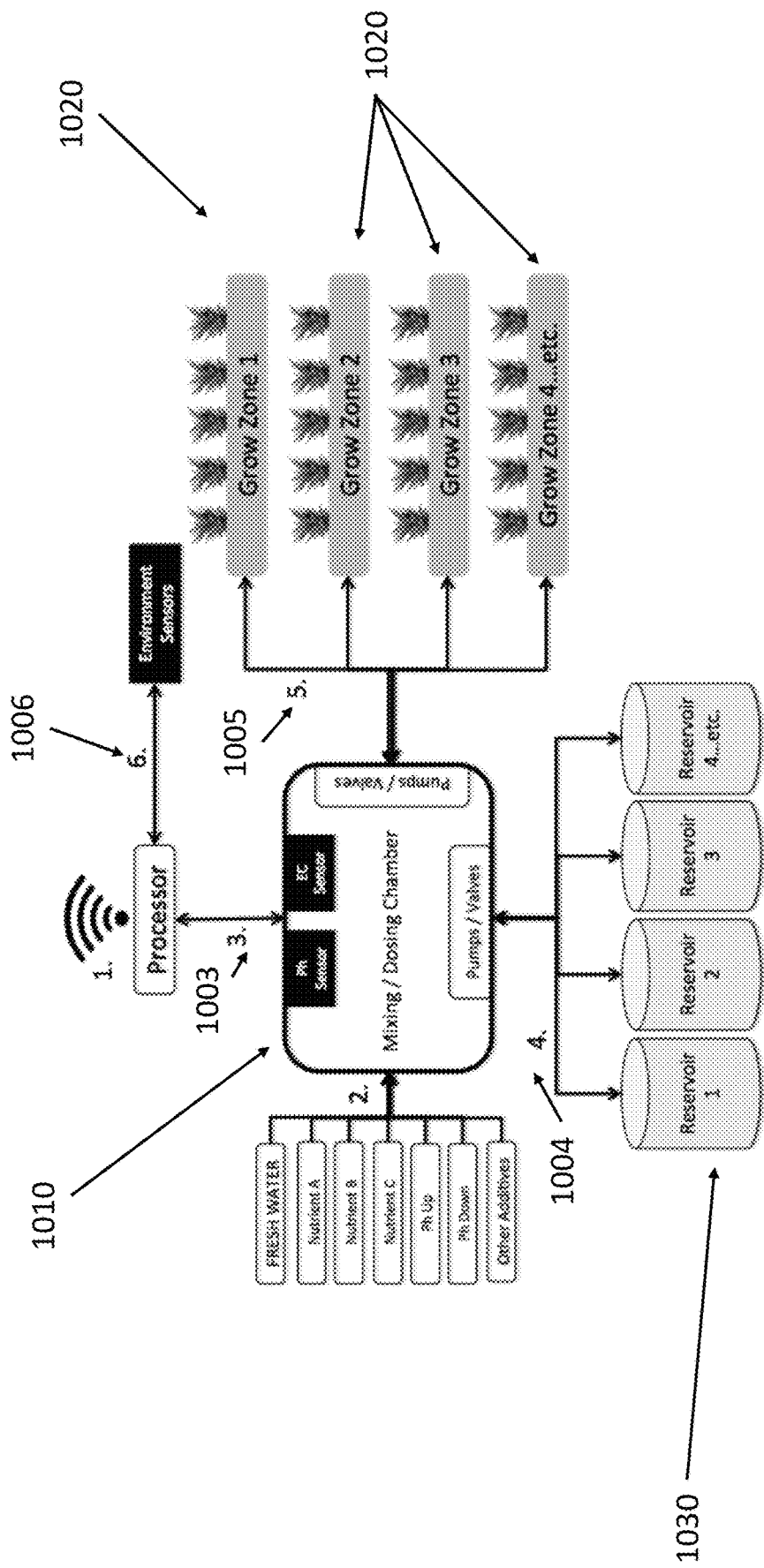
FIG. 1 is a schematic diagram of a depiction of one possible embodiment of the apparatus and system.

Reference will now be made in detail to various exemplary embodiments of the invention. It is to be understood that the following discussion of exemplary embodiments is not intended as a limitation on the invention. Rather, the following discussion is provided to give the reader a more detailed understanding of certain aspects and features of the invention.

The present invention has been described with reference to particular embodiments having various features. It will be apparent to those skilled in the art that various modifications and variations can be made in the practice of the present invention without departing from the scope or spirit of the invention. One skilled in the art will recognize that these features may be used singularly or in any combination based on the requirements and specifications of a given application or design. Embodiments comprising various features may also consist of or consist essentially of those various features. Other embodiments of the invention will be apparent to those skilled in the art from consideration of the specification and practice of the invention. The description of the invention provided is merely exemplary in nature and, thus, variations that do not depart from the essence of the invention are intended to be within the scope of the invention. All references cited in this specification are hereby incorporated by reference in their entireties.

Embodiments of the invention also include a computer readable medium comprising one or more computer files comprising a set of computer-executable instructions for performing one or more of the calculations, steps, processes and operations described and/or depicted herein. In exemplary embodiments, the files may be stored contiguously or non-contiguously on the computer-readable medium. Embodiments may include a computer program product comprising the computer files, either in the form of the computer-readable medium comprising the computer files and, optionally, made available to a consumer through packaging, or alternatively made available to a consumer through electronic distribution. As used in the context of this specification, a "computer-readable medium" is a non-transitory computer-readable medium and includes any kind of computer memory such as floppy disks, conventional hard disks, CD-ROM, Flash ROM, non-volatile ROM, electrically erasable programmable read-only memory (EEPROM), and RAM. In exemplary embodiments, the computer readable medium has a set of instructions stored thereon which, when executed by a processor, cause the processor to perform tasks, based on data stored in the electronic database or memory described herein. The processor may implement this process through any of the procedures discussed in this disclosure or through any equivalent procedure.

In other embodiments of the invention, files comprising the set of computer-executable instructions may be stored in computer-readable memory on a single computer or distributed across multiple computers. A skilled artisan will further appreciate, in light of this disclosure, how the invention can be implemented, in addition to software, using hardware or firmware. As such, as used herein, the operations of the invention can be implemented in a system comprising a combination of software, hardware, or firmware.

Embodiments of this disclosure include one or more computers or devices loaded with a set of the computer-executable instructions described herein. The computers or devices may be a general purpose computer, a special-purpose computer, or other programmable data processing apparatus to produce a particular machine, such that the one or more computers or devices are instructed and configured to carry out the calculations, processes, steps, operations, algorithms, statistical methods, formulas, or computational routines of this disclosure. The computer or device performing the specified calculations, processes, steps, operations, algorithms, statistical methods, formulas, or computational routines of this disclosure may comprise at least one processing element such as a central processing unit (i.e. processor) and a form of computer-readable memory which may include random-access memory (RAM) or read-only memory (ROM). The computer-executable instructions can be embedded in computer hardware or stored in the computer-readable memory such that the computer or device may be directed to perform one or more of the calculations, steps, processes and operations depicted and/or described herein.

Additional embodiments of this disclosure comprise a computer system for carrying out the computer-implemented method of this disclosure. The computer system may comprise a processor for executing the computer-executable instructions, one or more electronic databases containing the data or information described herein, an input/output interface or user interface, and a set of instructions (e.g. software) for carrying out the method. The computer system can include a stand-alone computer, such as a desktop computer, a portable computer, such as a tablet, laptop, PDA, or smartphone, or a set of computers connected through a network including a client-server configuration and one or more database servers. The network may use any suitable network protocol, including IP, UDP, or ICMP, and may be any suitable wired or wireless network including any local area network, wide area network, Internet network, telecommunications network, Wi-Fi enabled network, or Bluetooth enabled network. In one embodiment, the computer system comprises a central computer connected to the internet that has the computer-executable instructions stored in memory that is operably connected to an internal electronic database. The central computer may perform the computer-implemented method based on input and commands received from remote computers through the internet. The central computer may effectively serve as a server and the remote computers may serve as client computers such that the server-client relationship is established, and the client computers issue queries or receive output from the server over a network.

The input/output interfaces may include a graphical user interface (GUI) (see, e.g., FIG. 8), which may be used in conjunction with the computer-executable code and electronic databases. The graphical user interface may allow a user to perform these tasks through the use of text fields, check boxes, pull-downs, command buttons, and the like. A skilled artisan will appreciate how such graphical features may be implemented for performing the tasks of this disclosure. The user interface may optionally be accessible through a computer connected to the internet. In one embodiment, the user interface is accessible by typing in an internet address through an industry standard web browser and logging into a web page. The user interface may then be operated through a remote computer (client computer) accessing the web page and transmitting queries or receiving output from a server through a network connection.

The invention described herein is an automated hydroponic growing apparatus to simplify the process of hydroponic farming, especially for consumers. For example, in FIG. 1, a processor receives information regarding the crop variety in Growing Zone One 1020. Fresh water, nutrients, and other additives best suited to the crop variety in Grow Zone One are added the to the mixing chamber 1010. The mixing chamber senses the solution and sends information to the processor to determine whether the solution is optimized for the Crop Variety in Grow Zone One. The solution is pumped into Reservoir One 1030. The solution is circulated from Reservoir One to Grow Zone One. Environmental sensor readings are sent to the processor to better inform how to optimize the growing conditions for Grow Zone One. Regarding steps 3 1003, 4 1004, 5 1005, and 6 1006, they may be repeated constantly or periodically so that the crop variety in Grow Zone One has consistently optimized growing conditions. In aspects, the mixing chamber allows for this process to be repeated for Grow Zones 2, 3, 4, and so on 1025 without the need for any additional inputs or sensors, for example in the mixing chamber.

Figure 2:
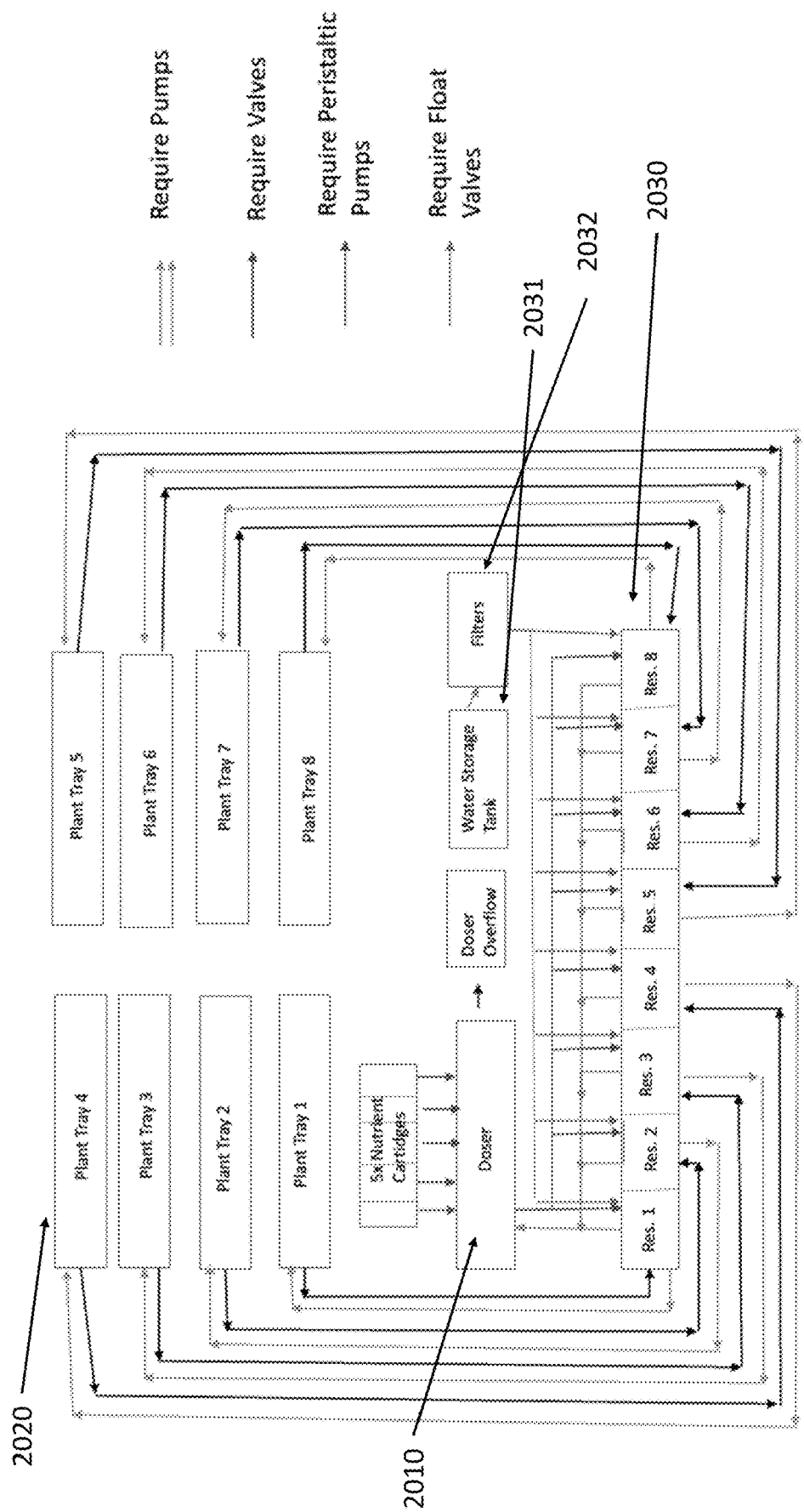
FIG. 2 is a schematic diagram of one possible embodiment of the apparatus and system.

Regarding FIG. 2, from the center of the figure, in this embodiment, a Water Storage 2031 tank circulates water through filters 2032 into a given reservoir 2030. Once each reservoir is filled with water, it is then circulated through the Doser 2010. The Doser is capable of sensing the water and adding nutrients and other additives to create a solution optimized for a specific plant type and its stage of growth. The adjusted water is circulated between its holding reservoir and its respective Plant Tray 2020. A computerized processor is capable of determining which plant type is in each Plant Tray, therefore, it instructs the Doser what needs to be in the optimized solution for that Plant Tray. The solution is routinely circulated through the Doser, sensed, and adjusted to ensure that conditions are optimized for a given plant type. This process is repeated for Plant Trays one through eight, for example, and could be expanded if more Plant Trays were added.

Figure 3:
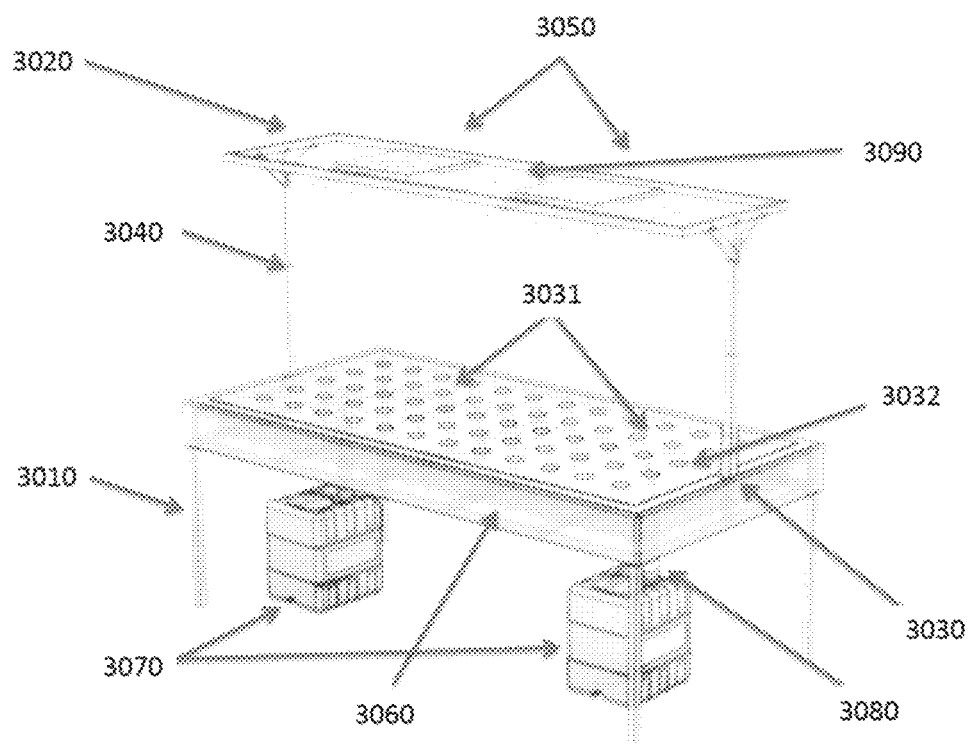
FIG. 3 is a schematic diagram of a depiction of one possible embodiment of the apparatus and system.

In another possible embodiment, a table-based design (see, e.g., FIG. 3 incorporates a core control system that automatically regulates certain variables, as explained herein, such as optimal nutrients and/or pH, for optimum plant growth with minimal user maintenance. The core control system is capable of powering a number of physical apparatus, such as several hydroponic growing systems/structures. The structure of the table 3060, in embodiments, utilizes an extruded aluminum frame that can be disassembled, although the frame can be made of any material sufficient to support the weight of the apparatus, including, but not limited to, plastic, wood, metal, or any other material. In aspects, the legs of the apparatus slot into a bracket in each of the four corners of the table 3010. The frame 3020 may slot into the bracket in the depicted grow area 3030. The preferably light frame has height or width that is variably adjustable, especially in terms of the height of the grow surface or the associated lights (see, e.g., 3040). This feature allows for the height or width of the grow area to be expanded to make room for larger plants or more plants, or made shorter or less wide for smaller or less plants. In aspects, the height and width are automatically adjusted by the system and apparatus when it recognizes a certain plant(s) being grown, such as based on input from a plug-in pod or pre-seeded tray as described herein, from the user, or from a camera and related software that are able to distinguish certain plants. The ability to manually raise, or have automatically raised, the height of the lights without having to make changes to the structure of the apparatus, enhances the versatility of the system without inconveniencing the user. The frame, in aspects, allows for trellising and other additional support structures to enable the growth of wide, tall, or vine plants. The light frame holds, in one embodiment, two 300 W LED grow lights 3050. However, the system may use anywhere from 1 to 16 lights with intensity ranging from 50 to 1000 watts. In a preferred embodiment, the lights are full-spectrum to ensure the correct wavelengths for photosynthesis, thereby allowing for faster, more efficient, and/or more optimal plant growth. LED grow lights use a fraction of the energy required to generate a similar light-intensity using other artificial grow-lighting methods. In aspects, the lights are controlled by a timer within the core control system (see, e.g., FIG. 4); they may also be connected to a photo resistor that dims the light intensity when people are nearby or when there is adequate natural light. The lighting may also be controlled by the system, such as by a processor. For example, if a certain plant type is recognized by the system, such as due to user input or information received from a plug-in pod, a pre-seeded tray, a QR code, a bar code, camera vision, and/or machine learning, the system will automatically provide that plant type with optimal lighting conditions and/or optimal water content and nutrients. The system allows for some plants to receive a certain set of lighting conditions and other plants to receive other lighting conditions, based on what are optimal lighting conditions for those plants. The lighting may also be manually adjusted by a user physically, electronically, or via remote wireless input.

Figure 4:
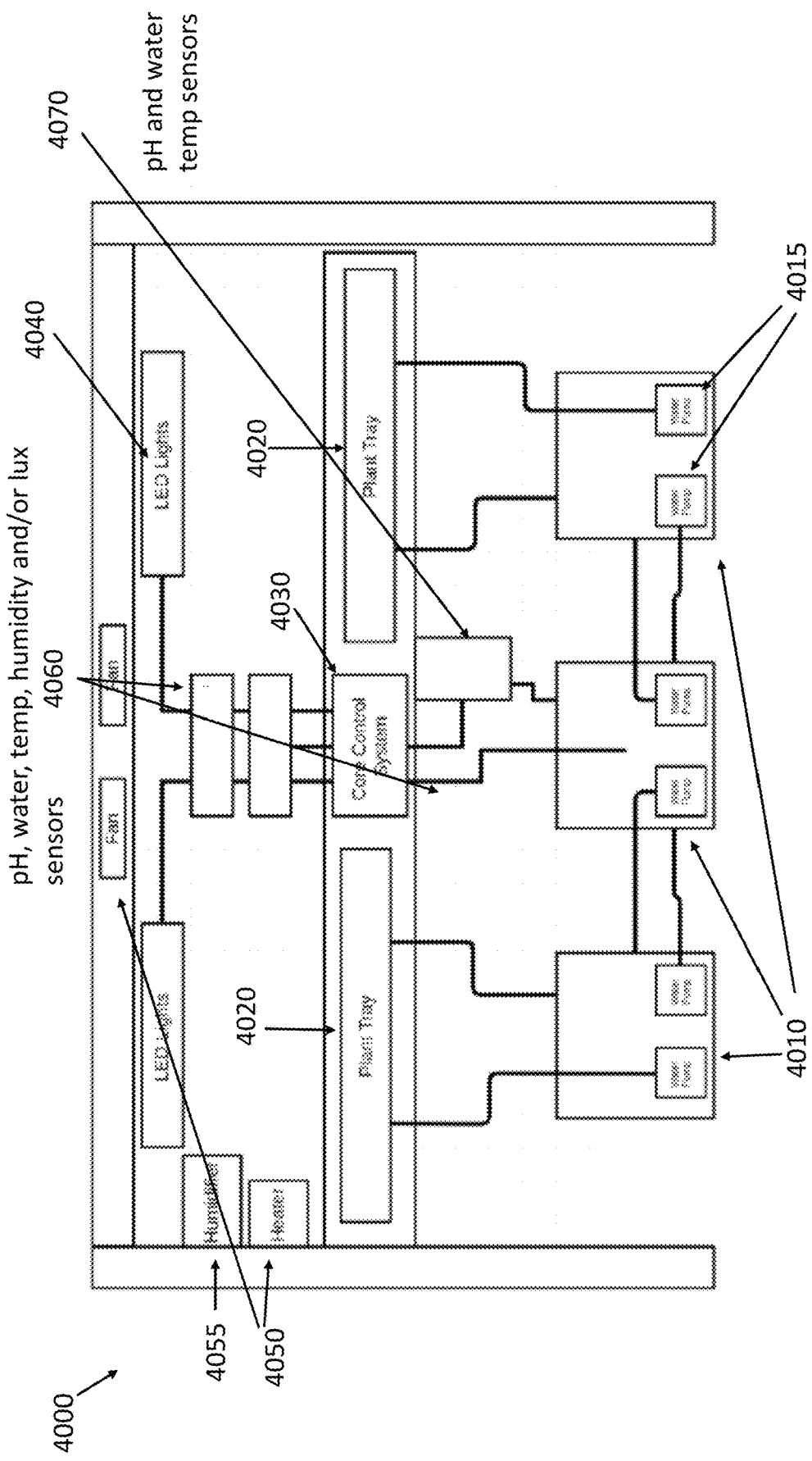
FIG. 4 is a schematic diagram of a depiction of one possible embodiment of the apparatus and system.

Similarly, the core control system 4030, which in cases is a computer processing unit, of the apparatus, for example as shown in FIG. 4, automatically regulates factors, including but not limited to, the pH, electrical conductivity, nutrient levels, temperature, humidity, water circulation, water aeration, carbon dioxide levels, air circulation, and/or light intensity or light wavelength. In aspects, the core control system is incorporated into or located near the structure of the table or the hydroponic growing apparatus/system taught herein; in other embodiments, it may be remote server based or in a remote electronic device, such as a computer or smartphone. The main circuit board may be located within or near the grow area. In embodiments, it may be wirelessly connected, thereby allowing users to remotely check, see, analyse, and/or monitor their crops and run experiments on growing conditions, change growing conditions, set growing conditions, learn about growing conditions, download growing conditions, search for growing conditions, and/or monitor growing conditions, such as via a remote electronic device (see, e.g., FIG. 8). In embodiments, the remote electronic device may be, for example, a computer processing unit, a server, a computer, a phone, a smartphone, a tablet, or other device capable of wireless communication. In embodiments, an air stone and/or water pump are housed within or near removable reservoirs (see, e.g., 3070). This feature enables water to be circulated into pre-seeded grow trays, plug-in pods, or other grow areas on automatic, regular, semi-regular, scheduled, periodic, manually-determined, and/or random cycles, which vary depending on plant type and/or stage of growth. The reservoirs may be easily accessible and removable allowing users to add water with minimal effort, and they may be connected via a piping system 3080 that allows for circulation to the pre-seeded grow trays, plug-in pods, or other grow areas, and for a sample solution to be read, monitored, and/or adjusted with the core control system or via user input.

Figure 6:
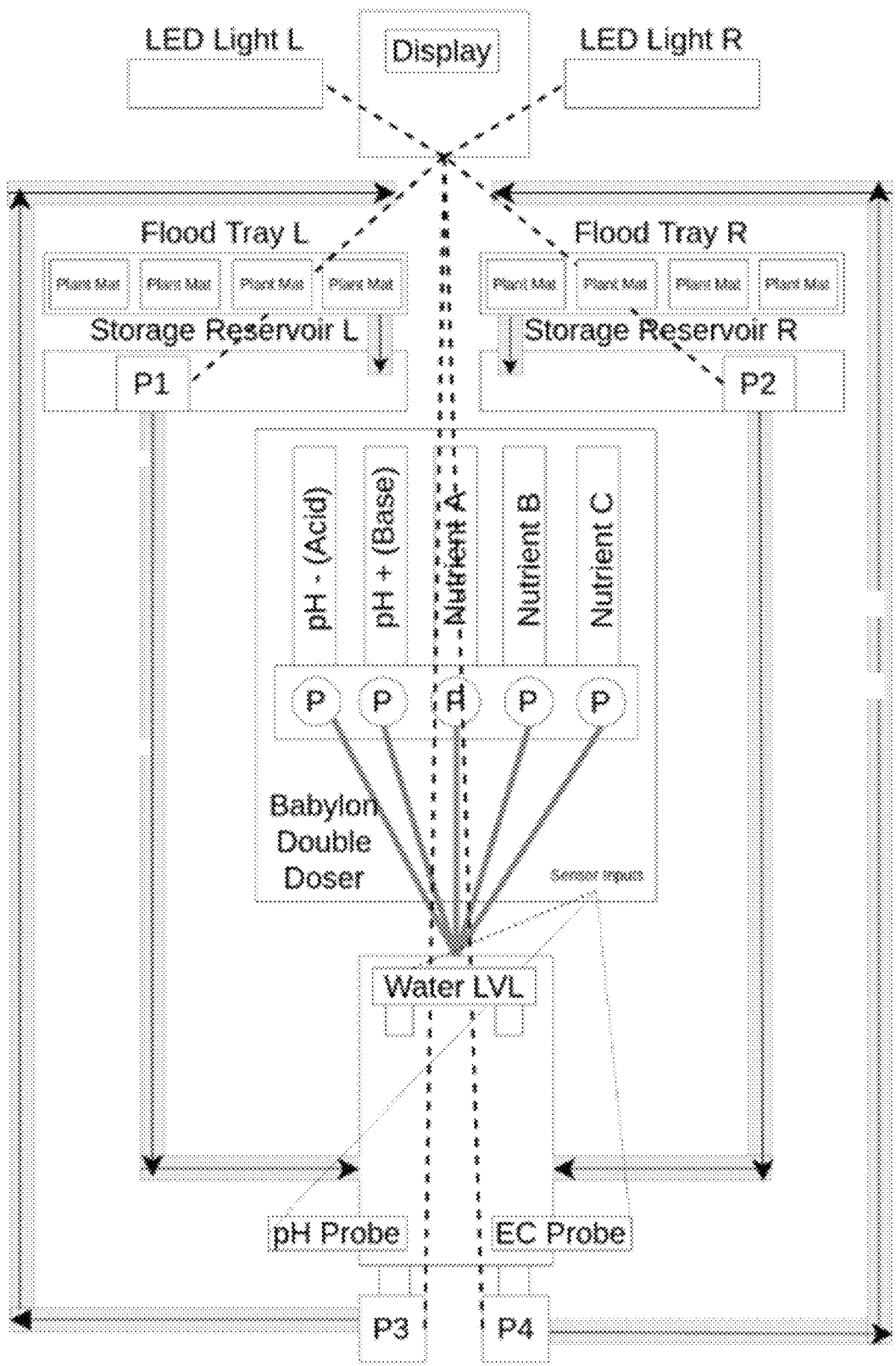
FIG. 6 is a schematic diagram of one possible embodiment of the apparatus and system.
Figure 7:
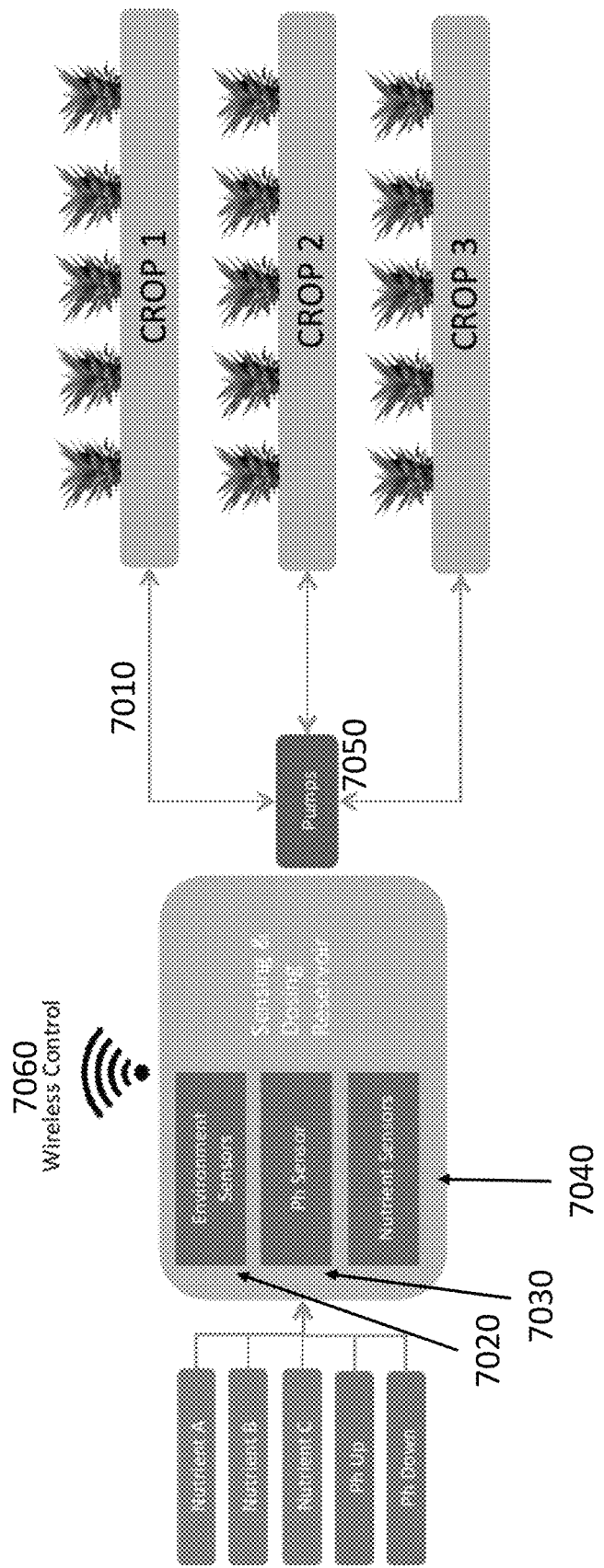
FIG. 7 is a schematic diagram of a depiction of one possible embodiment of the apparatus and system.

Each reservoir, in embodiments, is connected to a water-conditioning tank, or multi-doser, which contains, in certain embodiments, one or more pH sensor, one or more peristaltic pump pH adjuster, and/or one or more nutrient adjuster (see, e.g., FIGS. 6-7). In aspects, the conditioning tank comprises twelve solenoid valves to dispense adjusted solution to the pre-seeded grow trays. In embodiments, the system or device will allow for eight peristaltic pump pH adjusters and/or twelve solenoid valves, although the system may comprise one, two, three, four, five, six, and so on, peristaltic pump pH adjusters and/or solenoid valves. The multi-doser provides for a single measuring and adjusting unit that increases the efficiency of the system while removing the need for multiple units to do the same function for each reservoir. For example, the conditioning tank may automatically be provided instructions or commands from, for example, the core control system or a remote electronic device or server, to create an optimal water and/or nutrient condition for certain plants or plant lifecycle based on the optimal, desired, or programmed growing conditions for those plants. For example, if the system recognizes a certain plant based on the type of pod or tray it is contained in, the system can automatically create an optimal concentration of, for example, water, nutrients, and pH to maximize growth and viability of that plant. Other conditions may be created for other types of plants in the same system if the system knows what those plants are. The system may recognize the plants based on user input, camera recognition, machine learning or, for example, identifying information from a plug-in pod or on a tray, such as a bar code, QR code, unique shape(s) and/or color(s), microchip, RFID, signal, or any other means known in the art for identification of an item. Consequently, the same apparatus can contain different types of plants, all of which are optimally treated, and which may be monitored and adjusted by the core control system and/or a user in real- or near real-time, if desired. According to a preferred embodiment, for example, multiple plants or trays served by multiple reservoirs can all be regulated by a single mixing chamber (i.e., multi-doser), which is connected to or in physical contact with each reservoir at all times or part of the time.

In embodiments, the system may be designed to operate using pre-seeded trays. The trays may comprise a tray of an inert growth medium (e.g., rockwool and peat/foam mixtures), seeds or plants, and/or a QR code (or other identifying means). The pre-seeded growth media may reduce the time and hassle of planting crops. Pairing these pre-seeded consumables with a QR code, for example, further simplifies the process to make it plug-and-play, in embodiments. The QR code can be scanned by a user (or automatically) into the system and the technology, such as a processor, can identify what type of plant(s) is being inserted and/or the stage of plant(s) lifecycle. The system may then allow the core control system to alert the user where to place the pre-seeded insert and assign a unique growth recipe to it, for example. This allows the system to determine pH and nutrient levels along with temperature, humidity, CO2, lighting, water cycle(s), and other factors to recreate optimal conditions for the plant(s) to grow. In embodiments, the QR codes or other recognition technology are essentially serial numbers for each individual consumable tray, so that sensor data with each individual crop(s) type grown within the system can be recorded, managed, monitored, and/or maintained. This innovation works in harmony with the multi-doser, allowing the system to run efficiently by harnessing the data collected to create a preferable user experience.

Such QR codes or other recognition techniques on the pre-seeded consumables allow the hydroponic system(s) to track the crops throughout the system(s). This allows growers to associate data on crop growth with individual plant(s) in the system allowing them to harness that data to improve efficiency, boost yields, and package the data with their crops to increase transparency throughout the supply chain. This adds value to the end produce as many groups come into contact with produce before it reaches the consumer's plate; each can scan the QR codes, for example, which allows for location tracking and sensor data to be packaged with produce from seed to sale.

Figure 10:
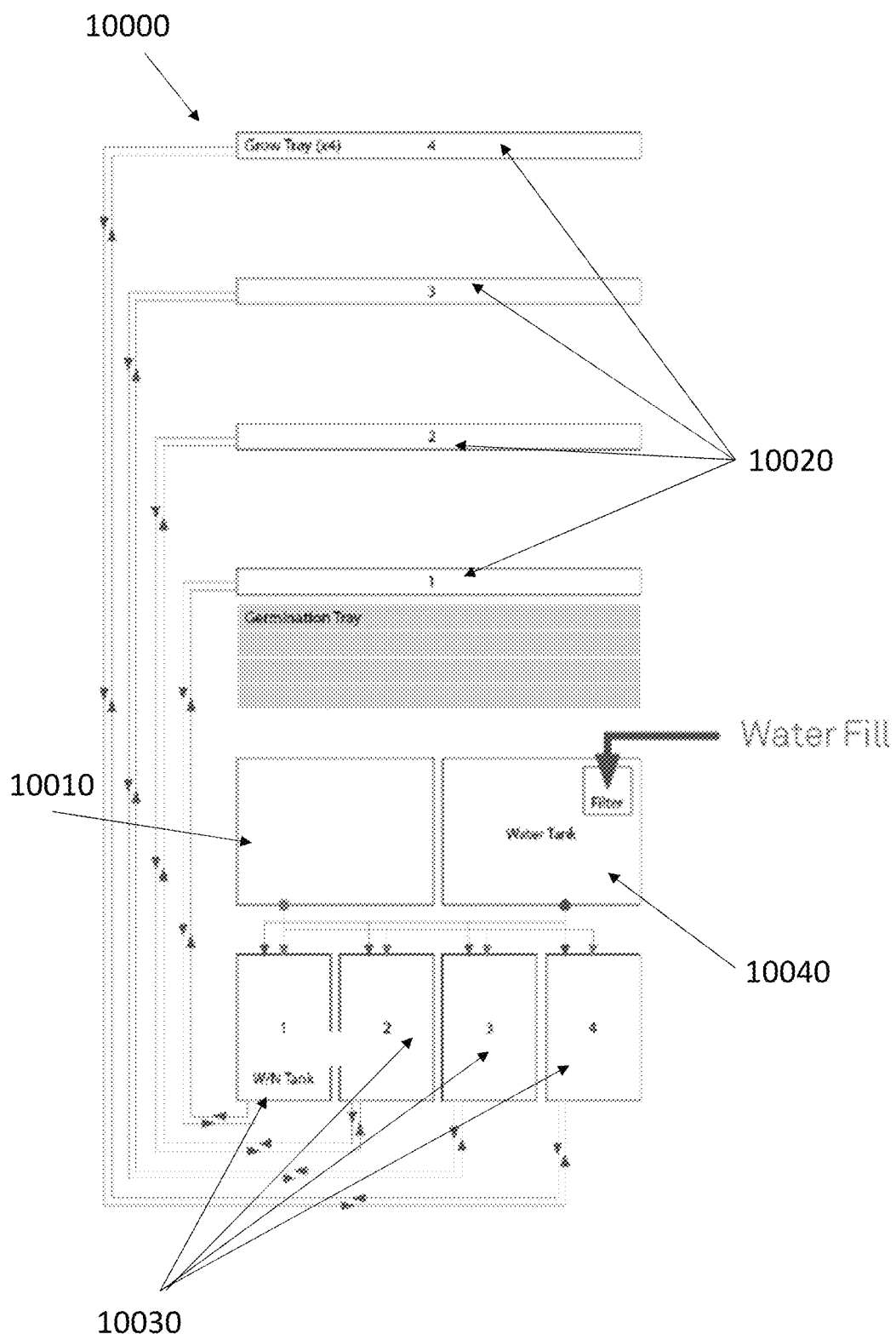
FIG. 10 is a schematic diagram of a depiction of one possible embodiment of the apparatus described herein; namely, the multi-doser as part of the system.

The multi-doser, as shown in FIG. 10 for example, automates nutrient dosing and pH adjustment for multiple reservoirs, growing zones, trays, or pods. This embodiment serves to reduce the cost of hydroponic growing since the system is capable of using one set of sensors for multiple crop varieties, trays, stages of growth, pods, etc. In embodiments, the multi-doser 10010 is capable of dosing crops on several different trays 10020, pods, or shelves in a cabinet-style (e.g., vertical) hydroponic growing system 10000. Accordingly, for example, shelves 10020 on a vertical system can have their own nutrient solution and pH on a shelf-by-shelf or area-by-area basis, which means a user can grow and/or manage different plants or different stages of growth on each shelf or area. This alleviates the need to buy separate dosers for each shelf, which is what is offered by the prior art. In other words, in preferred embodiments, a single multi-doser can regulate a plurality of reservoirs 10030 that sends water and nutrients to a plurality of plants, growing areas, and/or trays.

In FIG. 10, whereas in most automated dosing systems the sensors and dosers are located in the reservoir(s) 10030 that hold water, the current invention, in a preferred embodiment, provides for a single sensing and dosing chamber 10010 for one or more hydroponic growing apparatus (e.g., 10000). (In aspects, water may be located in the reservoir(s) 10030 and/or another water tank 10040.) For example, an overall hydroponic growing system may have several different tables or trays 10020 and a reservoir 10030 for each table or tray 10020. Sensors in or around the crops send information about the current growing conditions to the core control system (not pictured). Based on predetermined optimal, desired, programmed, and/or downloaded growing conditions, such as a growing recipe, the core control system can determine whether the growing conditions are non-optimal or not in comport with the predetermined optimal, desired, programmed, and/or downloaded growing conditions, and instruct the multi-doser to dose the crops with water and/or nutrients to bring the crop's growing conditions to an improved or optimal level. The multi-doser comprises a mixing chamber having sensors which mixes water, pH, nutrients and other growing factors based on instructions from the core control system or a user, or is capable of mixing through the process of circulation of liquid through the system, such as between a multi-doser and one or more reservoirs. The mixture will then be sent to the reservoir for the tray and pumped back to the tray or, in aspects, it may be pumped directly to the tray from the multi-doser. This creates a dynamic feedback control loop whereby information from the crop is sent to the core control system, the core control system determines if changes need to be made to the crop's growing conditions, the core control system instructs the multi-doser what the plant needs and/or what mixture to create, the multi-doser mixes the water, nutrients, and other factors, which it sends to a reservoir for pumping the mixture back to the crop (or directly to the crop). Continually, periodically, or after the crop meets its optimal or desired growing conditions, the same multi-doser can be used for other reservoirs connected to other trays (or for pumping mixture(s) directly to other crops or trays). In embodiments, a valve may shut to a first reservoir and valve to a second reservoir may open and connect the same multi-doser that was previously serving the first reservoir. Accordingly, a system with several trays and/or reservoirs can be serviced by one apparatus, the multi-doser, for dosing plants with proper water, nutrients, and other factors.

In embodiments, a machine learning feedback loop may be utilized. In embodiments, data is collected and actuated upon on multiple data points such as nutrient content, pH, humidity, temperature, and CO2 content. Suggested input values for these variables for each plant type may be found online or determined by a user, for example. A feedback loop may be achieved by incorporating camera vision and machine learning to determine outputs such as plant health, plant growth rate, etc. When such variables are measured, those outputs like plant health can be used to improve the way the system grows plants. On individual or a plurality of systems, the invention can adjust variable(s) to optimize plant growth, thus improving plant growth and other variable(s), such as speed of growth, taste, nutrition, etc. This may be used in conjunction with the multi-doser, because it allows for one or more separate growing zone, which can each be an individual trial in large scale tests.

In embodiments, the system could physically move the multi-doser to different reservoirs, or reservoirs could be moved to the multi-doser. A hybrid approach is also possible wherein each reservoir has sensors, but they share a similar multi-doser, or vice versa. The reservoirs could also be connected to the multi-doser by tubing, pipes, or similar mechanisms of connecting the multi-doser and reservoirs.

In another embodiment, when the pH and nutrient content of a reservoir must be checked, the current invention activates pumping water from that reservoir into the common mixing chamber (multi-doser) and back to its reservoir. (In another aspect, water can come from a separate water tank.) As it circulates, it immerses the sensors in the multi-doser. Based on the data recorded by the sensors in the multi-doser, the system doses nutrients and pH solution directly into the mixing chamber. The circulation mixes the solution and the sensors monitor the water (or other liquid) and instruct the pumps when the desired nutrient concentration or pH has been achieved. This process is repeated until the pH and nutrient concentration comports with a pre-programmed growth recipe for a given reservoir or plant or tray, for example. The system then circulates the solution from the next reservoir in the same fashion, sensing, mixing, and repeating until the values reach the goals for that independent reservoir, which dose other plants in the hydroponic apparatus. The system cycles through and corrects the reservoirs on a periodic basis; this process can be repeated as frequently as a user of the system desires to maintain optimal conditions within the nutrient solution for any given crop, tray, pod, apparatus, or system. It may also be determined by the core control system.

Figure 11:
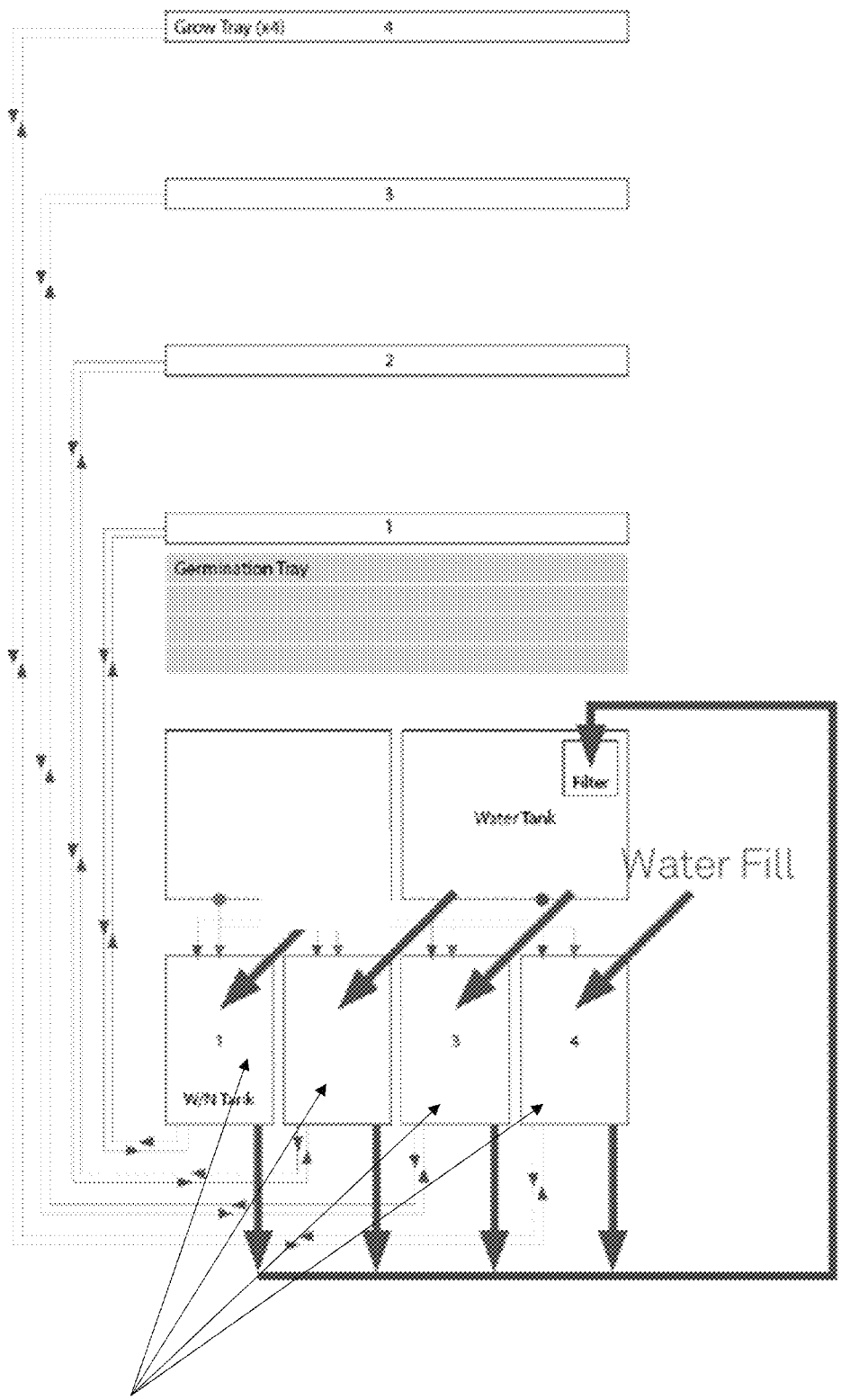
FIG. 11 is a schematic diagram of a depiction of one possible embodiment of the apparatus described herein; namely, the multi-doser as part of the system.
Figure 12:
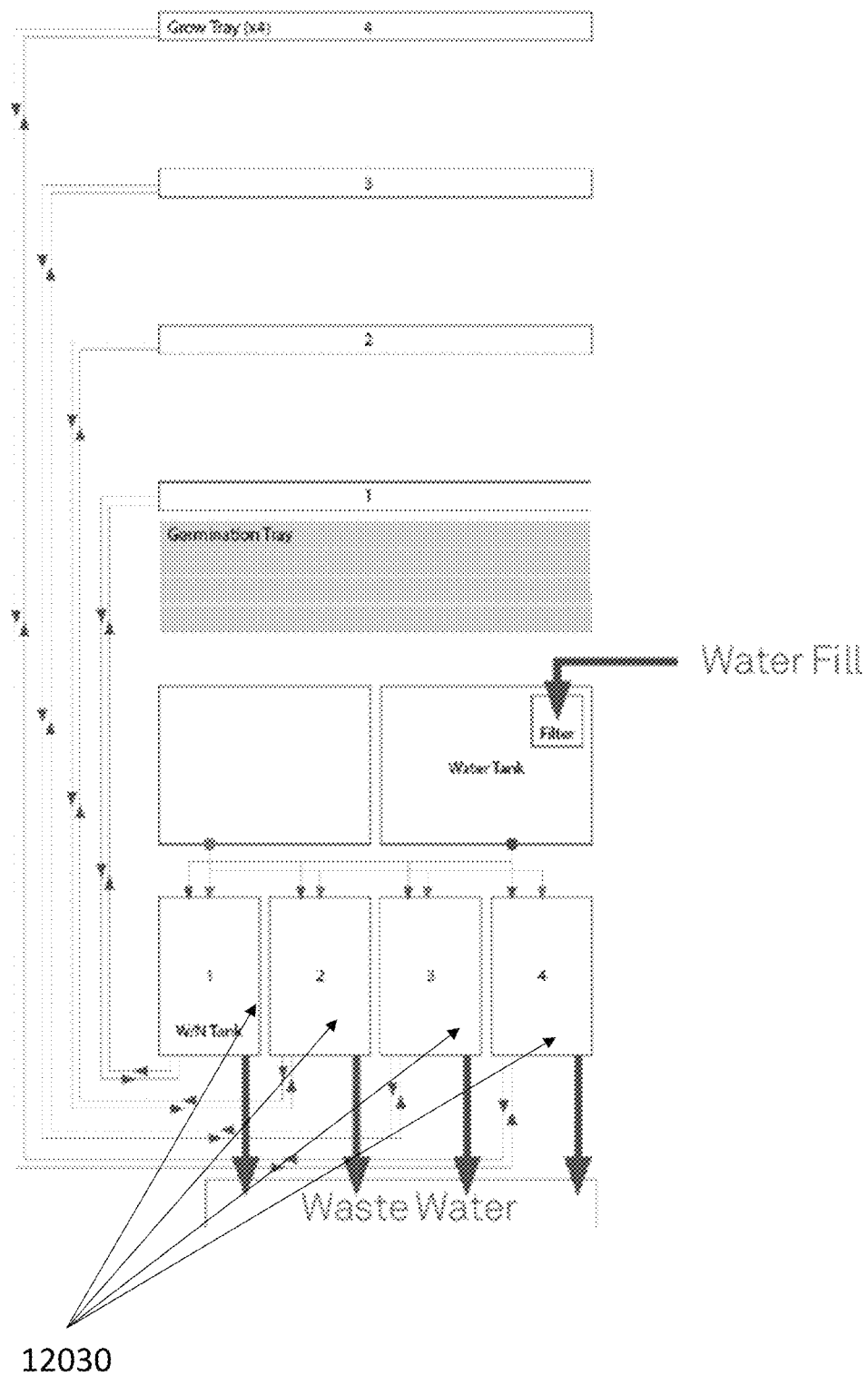
FIG. 12 is a schematic diagram of a depiction of one possible embodiment of the apparatus described herein; namely, the multi-doser as part of the system.

In embodiments, the conditioning tank is connected to the pH solution and nutrient solution via quick connect cartridges that can be replaced by the user. The system then monitors, adjusts, alerts, and otherwise takes care of technical measurements and necessary adjustments with or without user intervention. The system has the ability to be connected to a water line, thus removing the need for users to fill the reservoirs at regular or periodic intervals. For example, in FIG. 11, the reservoirs 11030 are filled with water and, in a preferred embodiment, the reservoirs do not need to be refilled during a plant lifecycle. In FIG. 12, the reservoirs 12030 are filled with water and/or water may come from a separate tank or water source and, in a preferred embodiment, waste from the system flows to a drain, further simplifying using the overall system.

A main circuit board may be connected to another smaller environmental sensing board that may be embedded in the frame 3090. (In certain aspects, the system may provide for a separate board that handles AC or DC power switching or environment controlling.) The sensors may include any one or more of: Lux/Par, carbon dioxide, temperature, and/or humidity (see, e.g., FIG. 4). The readings from these sensors may be used manually or automatically to control an air-circulating fan, a humidifier, and/or LED grow lights that, in aspects, are embedded within the light frame or elsewhere on or near the apparatus. This enables the internal environment of the system to be manually or automatically regulated to provide the optimum conditions for plant growth.

The grow area may be divided into two or more separate grow trays 3031, tables, pods, or shelves (e.g., vertical shelves in, for example a cabinet design), each connected to a reservoir, although they may each be coupled directly to the multi-doser, in aspects. In other embodiments, the grow trays, tables, or shelves may comprise a vacuum formed polyethylene tray with a network of ridges to support the plant plug-in pods or plants and ensure equal, near-equal, or different distribution of solution within each grow tray, table, or shelf. The grow area may be divided into two or more sections to give the system greater flexibility and growing capabilities; this allows users to stratify the planting of crops. The stratification of crops allows users to have a constant, near-constant, automated, manual, scheduled, periodic, regular, or irregular supply of fresh produce by allowing one section to, for example, be in the early stages of growth while another section is ready for harvest. The divided grow area(s) can also allow users to grow crops that require a different balance of nutrients simultaneously. This provides the system with versatility not known in the prior art allowing users to grow almost any non-root fruit, vegetable, leafy green, or herb, by way of example. In some embodiments, plant holes 3032 can be opened or closed to make way for larger or smaller plants while ensuring the system remains airtight or near-airtight, if desired. This also allows users to gradually harvest some plants and close the plant holes gradually, making more room for plants to grow into.

Inputs for hydroponic plant growth, in addition to oxygen, carbon dioxide, biologic additives (e.g., bacterial fungicide), pH solution, and light, among other things, are mainly water and nutrients. Nutrients, in general, refers to elements such as calcium, magnesium, sodium, potassium, nitrogen, phosphorus, sulphur, chlorine, iron, manganese, copper, zinc, boron, and/or molybdenum that are available in a form that enables plant growth. These elements can be formulated into concentrated solutions that can be added to water in concentrations that can be easily absorbed by the plant roots. In the current invention, the nutrients are dispensed into, for example, a conditioning reservoir (e.g., multi-doser) based on electrical conductivity readings and the stage of plant growth. The nutrient solution may be supplied in quick-connect cartridges that may be retailed separately from the system.

According to the present invention, plants may be introduced into the system by pre-seeded trays tailored to work with the system. The plant trays may, in part, comprise a plastic mesh casing that contains an inert growth medium and seed(s), seedling(,) or young plant(s). The trays may be supplied to the users separately and come in a variety of options, including varying plant types. In a preferred embodiment, the trays/plants remain in place from germination to harvest.

The pre-seeded trays, in embodiments, or in other embodiments plug-in pods, may be placed or introduced into the apparatus at varying places in the system, such as on different vertically placed shelves, and different plants can be placed in different places but in the same apparatus. When the trays are identified by their plant or growth matrix, the system will then automatically adjust for optimal growing conditions for that type of plant as explained herein; consequently, parameters such as lighting and water/nutrient content may be automatically changed in order to increase the chances of optimal growth for a particular type of plant based on known conditions that are likely to improve the growth of that type of plant. The system has the capability of varying the light and/or water/nutrient content on a plant-by-plant or tray-by tray basis, for example, based on optimal growing conditions for that type of plant.

According to the current invention, the growing process is simplified from a user's perspective, enabling controlled plant cultivation to be accessible to users with little to no previous growing experience. When users purchase one of the systems, the system may arrive in an easy-to-assemble kit. Once assembled, in certain embodiments, users add in the necessary nutrient and pH quick connect cartridges that may last for multiple crop cycles. In certain embodiments, users can then insert plant pods, trays, tables, or shelves of their chosen variety. In aspects, once inserted into the system, the trays, for example, may be left until the seed has germinated and the first leaves appear. Users can then remove the plastic cap or covering or sheet to the pods or trays and leave the seedling to grow until harvest, or the pod or tray, for example, may be designed so that the user does not have to adjust the plug-in pod or pre-seeded tray once it is introduced into the system. In another embodiment, a user moves plant trays or pods from a dedicated germination area to a tray or other area where it will stay until harvest. Users can select the plant type using an Internet connected device such as mobile phone, tablet, or personal computer, or by catalogue or any other known method of ordering products. In a preferred embodiment, once the plant type is selected, the core control system will automatically regulate the conditions for plant growth from germination to harvest. Users are able to adjust the settings to conduct growing experiments, or otherwise affect growing conditions, if desired. The core control system may collect data throughout the growing cycle to optimize growing conditions for that apparatus or share with other apparatus via wireless connection, the internet, or the cloud, for example.

Turning now to a few additional figures, FIG. 4 shows one possible embodiment of the system. In this particular embodiment, starting from the bottom of the schematic and moving upwards, the apparatus 4000 comprises reservoirs 4010, in most cases containing mostly water, along with water pumps 4015 to pump the water or liquid to the plant growing trays 4020. In a preferred embodiment, a processor (s) in the core control system 4030 is receiving information from the plant trays, such as information about the condition of the growth medium or the plant(s). It may also receive information about plant type, condition, and state of growth from one or more plug-in pod(s), from a pre-seeded tray, from a sensor(s), from a camera(s), and/or from a user. The system creates a feedback loop wherein information received by the core control system sends commands to, for example, the water pump and the pH and/or nutrient dispensers 4070. Based on the information received from the plant trays, plug-in plant pod, other sensor(s), or a user, an optimal amount of water and nutrients are supplied to the plant and/or the growth medium. Similarly, light, temperature 4050, humidity 4055, and other conditions related to the plants may be monitored, controlled, and adjusted by the core control system, such as by using sensors 4060. In embodiments, the apparatus and underlying system will comprise, in aspects, LED lights 4040 for growing, although other types of lights may be used. Similarly, in FIG. 6, a system feedback loop is shown wherein probes or sensors receive information relating to the plant's condition as well as the condition in which it is growing and, based on that feedback, optimal water, nutrients, pH, and/or light are supplied or not supplied to the plant or its growth medium.

Figure 5:
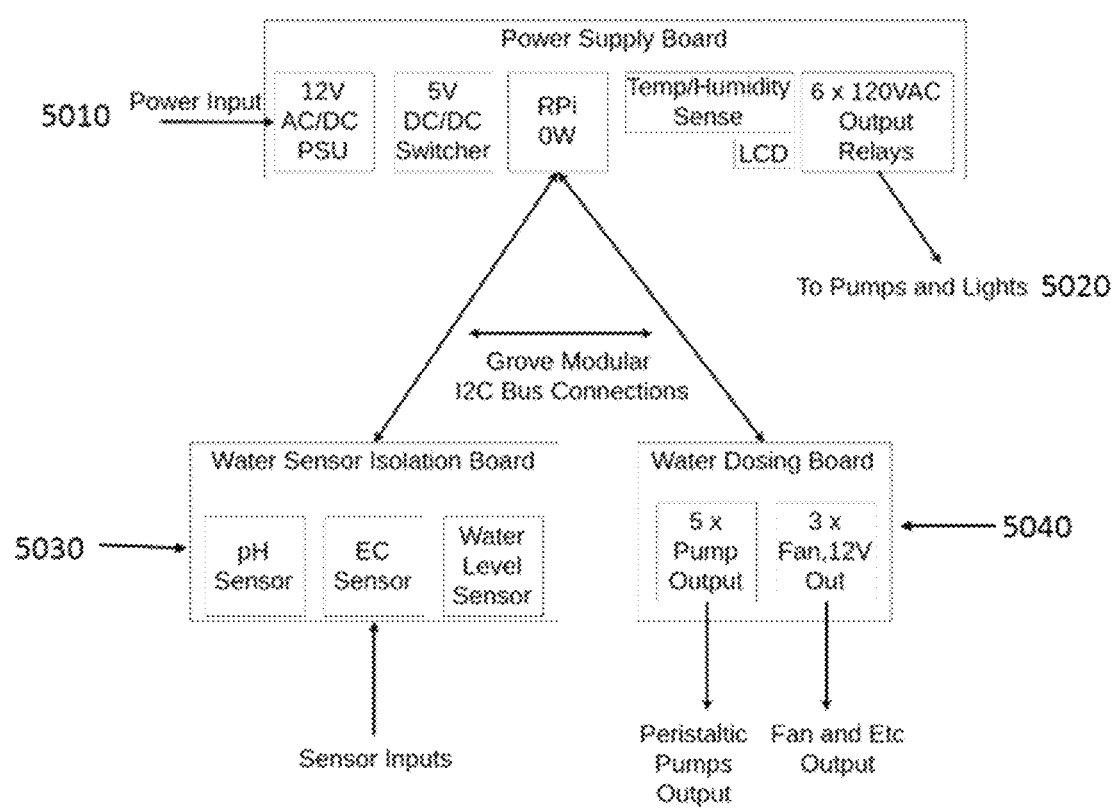
FIG. 5 is a schematic diagram of one possible embodiment of the system, including possible electrical aspects.

In FIG. 5, underlying electrical information of a particular embodiment of the invention is shown. In this example, power input 5010 is supplied to a power supply board that sends power to various components, for example the liquid pumps and LED lights 5020. Power is also sent to, for example, the sensors, a sensor isolation board 5030, and/or pumps, such as on a water dosing board 5040.

In FIG. 7, the schematic exemplifies one possible embodiment of a feedback loop 7010 wherein information from the crops, including directly from the crops and/or from environment sensors 7020, pH sensors 7030, and/or nutrient sensors 7040, by or through a processor or user input (for example), determines what is pumped 7050 back to the crops, including water, nutrients, and/or pH components, and also how the crops are treated in terms of light, temperature, and/or humidity. As indicated 7060, the information can be communicated wirelessly to a remote core control system, a computer, a phone, a tablet, the internet, and/or the cloud, for example.

Figure 8:
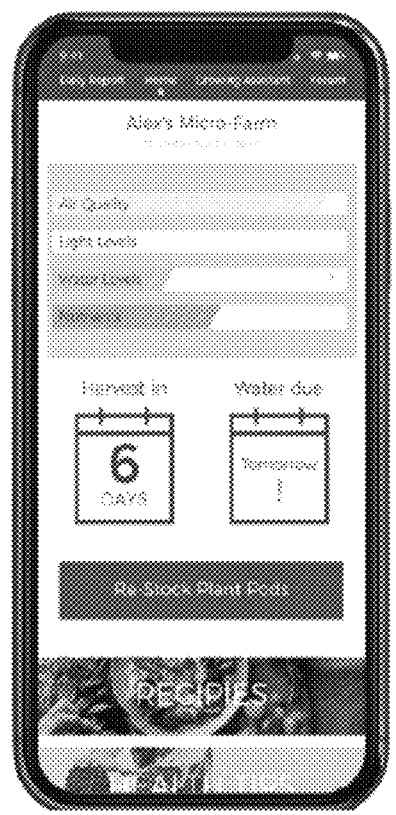
FIG. 8 is a diagram of a depiction of one possible embodiment of the apparatus and system as it relates to computer software application(s) and remote electronic device(s) associated with the apparatus and system.

FIG. 8 is a possible embodiment of a GUI and associated computer software application on a remote electronic device, such as a smartphone, wherein the system allows a guided growing experience 8010, remote crop monitoring 8020, including air/light/water/nutrient levels, live plant growth analytics 8030, recipe suggestions using, in whole or in part, the crops being grown 8040, and the capability of restocking plants or ordering new plants 8050, such as by ordering plug-in plant pods, individual plants, and/or pre-seeded plant trays.

Figure 9:
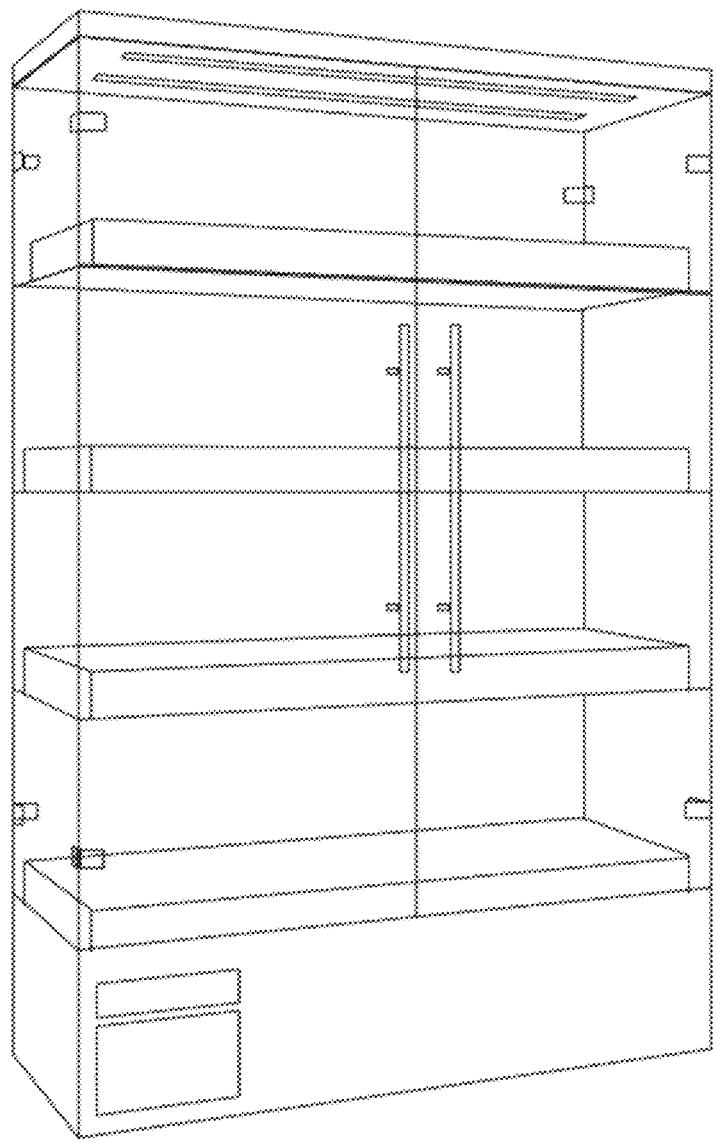
FIG. 9 is a schematic diagram of a depiction of one possible embodiment of the apparatus/device described herein.

FIG. 9 shows a possible embodiment wherein the growing areas, including pre-seeded trays, may be stacked vertically and encased as shelves in a cabinet, for example in a transparent, opaque, or semi-transparent cabinet.

EXAMPLES

Example 1

An apparatus of this invention was used as a functional growing appliance for home use. The system was used to grow basil, lettuce, spinach, kale, and bok choy. The system allowed for the year-round growth of fresh produce, which was consumed by the users.

Example 2

An apparatus of this invention has been used as a growing appliance in a restaurant dynamic. The system was used to grow mint and parsley for use in, for example, drinks served to customers. The system was a productive appliance, and the restaurant was able to save money on at least two key ingredients.

Example 3

An apparatus of this invention has been used as an interdisciplinary educational tool at the University of Virginia. The system is used as an individual means of teaching students about sustainable agricultural practices, plant biology, nutrition, cooking, and living a healthy lifestyle. The systems allow educators to provide an engaging experiment for students year round. The system has multiple features that align with the setup core curriculum for interdisciplinary education.

Example 4

The core control system has been integrated into designs and apparatus relating to the current invention described herein. For example, it has been integrated into a vertical system that is attached to a wall or support structure enabling plant growth with more efficient space usage (see., e.g., FIG. 9). The core control system has also been tested on a larger fridge-styled system that contains multiple shelves for plants to grow on (see., e.g., FIG. 10). Accordingly, the growing surfaces can be stacked vertically or connected or placed horizontally to increase the growing area(s).

Example 5

The core control system has been tested as a modular device that can be applied to any hydroponic apparatus. This would allow for hydroponic farming operations being automatically regulated via one modular control system. The applications for the core control system extend to the current system and as a retrofit for less advanced systems; the functionality of the system, in aspects, removes the need for multiple different components involved in regulating a hydroponic farming operation. This would make hydroponic growing methods more accessible by reducing the complexity of the system and lowering the price, thus removing many of the current barriers to entry.

One skilled in the art will recognize that the disclosed features may be used singularly, in any combination, or omitted based on the requirements and specifications of a given application or design. When an embodiment refers to "comprising" certain features, it is to be understood that the embodiments can alternatively "consist of" or "consist essentially of" any one or more of the features. Other embodiments of the invention will be apparent to those skilled in the art from consideration of the specification and practice of the invention.

It is noted in particular that where a range of values is provided in this specification, each value between the upper and lower limits of that range is also specifically disclosed. The upper and lower limits of these smaller ranges may independently be included or excluded in the range as well. The singular forms "a," "an," and "the" include plural referents unless the context clearly dictates otherwise. It is intended that the specification and examples be considered as exemplary in nature and that variations that do not depart from the essence of the invention fall within the scope of the invention. Further, all of the references cited in this disclosure are each individually incorporated by reference herein in their entireties and as such are intended to provide an efficient way of supplementing the enabling disclosure of this invention as well as provide background detailing the level of ordinary skill in the art.

REFERENCES

All references cited in this application are incorporated herein by reference.

U.S. Patent Publ. No. US20090223128A1 Hydroponic Monitor And Controller Apparatus with Network Connectivity and Remote Access U.S. Patent Publ. No. US20060272210A1 Smart garden devices and methods for growing plants U.S. Patent Publ. No. US20080276534A1 Devices and methods for growing plants by measuring liquid consumption U.S. Pat. No. 8,443,546B1 Hydroponic plant growing system U.S. Pat. No. 4,543,744A Plant growing chamber U.S. Patent Publ. No. US20130019527A1 Mobile, Automatic Plant Growth System U.S. Patent Publ. No. US20140318012A1 Plant Growing Device China Patent No. CN205727249U Plant and plant pipe and plant system of planting U.S. Patent Publ. No. US20090288340A1 LED Grow Light Method and Apparatus China Patent No. CN205840428U A miniature farm for practical education U.S. Pat. No. 4,932,158A Method and apparatus for hydroponic gardening U.S. Pat. No. 6,178,692B1 Lighting system for use with a vertical growing column U.S. Pat. No. 5,555,676A Vertical planter apparatus and method

The invention claimed is:

1. A hydroponic growing system comprising:
   a. a mixing chamber comprising one or more sensors capable of measuring an amount of water and/or nutrients;
   b. a plurality of reservoirs connected to the one mixing chamber,
      wherein the mixing chamber and/or the plurality of reservoirs are connected to two or more growing zones designated for one or more plant varieties,
      wherein mixing of the water and nutrients occurs by 1) circulation through one or more of the mixing chamber, one or more of the plurality of reservoirs, and one or more of the two or more growing zones designated for one or more plant varieties, 2) mixing in the mixing chamber and/or one or more of the plurality of reservoirs, or 3) a combination thereof, and
      wherein the system is capable of recapturing and readjusting a first water and nutrient mixture from one or more of the two or more growing zones designated for one or more plant varieties and sending a readjusted second water and nutrient mixture back to the one or more of the two or more growing zones designated for one or more plant varieties; and
   c. a processor capable of 1) determining whether to adjust the amount of nutrients and/or the amount of water based on information from the one or more sensors, 2) instructing the mixing chamber to adjust or not to adjust the amount of the water and/or nutrients, 3) determining which of the plurality of reservoirs to send the water and/or nutrients to, (4) sending the water and/or nutrients to one or more of the plurality of reservoirs and/or to one or more of the two or more growing zones designated for one or more plant varieties, and/or 5) automatically opening and closing a connection(s) between a chosen reservoir and the mixing chamber.

2. The hydroponic dosing system of claim 1, wherein the two or more growing zones designated for one or more plant varieties comprise a second one or more sensors coupled to the processor.

3. The hydroponic dosing system of claim 1, wherein
   a. liquid is capable of being transferred, pumped, sent, circulated, or delivered from one or more of the two or more growing zones designated for one or more plant varieties to one or more of the plurality of reservoirs;
   b. the liquid is capable of being transferred, pumped, sent, circulated, or delivered to the mixing chamber from the one or more of the plurality of reservoirs;
   c. nutrients in the liquid are capable of being sensed by the one or more sensors; and
   d. the processor is capable of determining whether to adjust an amount of the nutrients and/or an amount of the water based on information about the liquid from the one or more sensors.

4. The hydroponic dosing system of claim 1, wherein liquid is capable of being sent from the two or more growing zones designated for one or more plant varieties to one or more of the plurality of reservoirs, wherein the liquid is capable of being sent from one or more of the plurality of reservoirs to the mixing chamber, wherein the one or more sensors are capable of sending information about the liquid to the processor, and wherein the processor is capable of instructing the mixing chamber to add or not to add nutrients or other additives to the liquid and to send the liquid to one or more of the plurality of reservoirs for sending to one or more of the two or more growing zones designated for one or more plant varieties or sending the liquid directly to one or more of the two or more growing zones designated for one or more plant varieties.

5. The hydroponic dosing system of claim 4, wherein the nutrients or other additives include one or more of: an acid, an acid solution, a base, a base solution, nitrogen, phosphorus, potassium, iron, calcium, magnesium, sulfur, boron, copper, manganese, molybdenum, zinc, a pH down adjuster, an pH up adjuster, dissolved oxygen, amino acids, growth hormones and/or enzymes, water, water purifiers, hydrogen peroxide, water sterilization components, fungicide, herbicide, probiotics, antibiotics, chemicals that can enhance growing conditions for a given plant type, and/or mixtures of these nutrients and/or other additives.

6. The hydroponic dosing system of claim 1, wherein the mixing chamber is capable of mixing, adjusting, and/or circulating the water and/or nutrients and sending the water and/or nutrients to one or more of the plurality of reservoirs depending on which of the one or more of the plurality of reservoirs is open to accept the water and/or nutrients as directed by the processor.

7. The hydroponic dosing system of claim 1, wherein one or more of the plurality of reservoirs comprises a valve for opening and closing a connection to or from the mixing chamber and/or a pump for allowing or disallowing liquid to enter or leave one or more of the plurality of reservoirs.

8. The hydroponic dosing system of claim 1, wherein one or more of the one or more sensors measures one or more of: electrical conductivity, total dissolved solids, pH, temperature, dissolved oxygen, flow rate, pressure, CO2, temperature, humidity, lux, par, wavelength, soil moisture, leaf turgidity, nitrogen, phosphorus, potassium, iron, calcium, magnesium, sulfur, boron, copper, manganese, molybdenum, zinc, amino acids, growth hormones and/or enzymes, water, water purifiers, hydrogen peroxide, water sterilization components, fungicide, herbicide, probiotics, antibiotics, and/or chemicals or nutrients that can enhance growing conditions for a given plant type.

9. The hydroponic dosing system of claim 2, wherein one or more of the second one or more sensors measures one or more of: electrical conductivity, total dissolved solids, pH, temperature, dissolved oxygen, flow rate, pressure, CO2, temperature, humidity, lux, par, wavelength, soil moisture, water, moisture, leaf turgidity, nitrogen, phosphorus, potassium, iron, calcium, magnesium, sulfur, boron, copper, manganese, molybdenum, zinc, amino acids, growth hormones and/or enzymes, water purifiers, hydrogen peroxide, water sterilization components, fungicide, herbicide, probiotics, antibiotics, and/or chemicals or nutrients that can enhance growing conditions for a given plant type.

10. The hydroponic dosing system of claim 1, wherein the processor is in wired or wireless communication with one or more of the Internet, a computer, a computer processing unit, a phone, a smartphone, a server, a tablet computer, and/or a laptop computer.

11. The hydroponic dosing system of claim 1, wherein the processor is one or more of a computer processing unit, a computer, a microprocessor, a graphics processing unit, a microchip, a circuit board, a server, or the internet.

12. The hydroponic dosing system of claim 1, wherein the mixing chamber is capable of receiving water or other liquid from one or more of the plurality of reservoirs or another water source, and/or sending water or other liquid to one or more of the plurality of reservoirs, another water source, a drain, or a drainage pipe or mechanism.

13. The hydroponic dosing system of claim 1, wherein the mixing chamber is capable of being injected with or adjusted with an acid, an acid solution, a base, a base solution, nitrogen, phosphorus, potassium, iron, calcium, magnesium, sulfur, boron, copper, manganese, molybdenum, zinc, a pH down adjuster, an pH up adjuster, dissolved oxygen, amino acids, growth hormones and/or enzymes, water, water purifiers, hydrogen peroxide, water sterilization components, fungicide, herbicide, probiotics, antibiotics, chemicals that can enhance growing conditions for a given plant type, and/or mixtures of these nutrients and/or other additives.

14. The hydroponic dosing system of claim 1, wherein the processor includes or has access to information related to optimal, near-optimal, programmed, learned, manually input, and/or desired growing conditions for plants or plant growing medium.

15. The hydroponic dosing system of claim 1, wherein the processor compares information from one or more of the first and/or second one or more sensors associated with growing conditions in, on, or near one or more of the two or more growing zones designated for one or more plant varieties, to optimal, near-optimal, programmed, learned, manually input, and/or desired growing conditions for one or more of the two or more growing zones designated for one or more plant varieties or a plant, plants, seed, seeds, seedling, seedlings, and/or growing medium.

16. The hydroponic dosing system of claim 1, wherein one or more of the plurality of reservoirs comprises a third one or more sensor.

17. The hydroponic dosing system of claim 1, wherein the one or more sensors sense one or more of lux/par, nutrient(s) level, carbon dioxide, temperature, humidity, submersible pH, electrical conductivity, and/or water level, and wherein one or more readings from the one or more sensors are received by the processor and, based on the one or more readings, the processor is capable of instructing, regulating, adjusting, and/or sending one or more commands to the mixing chamber, which further comprises a pH adjuster, a pH dispenser, a water pump or intake, an air stone, and/or a nutrient dispenser.

18. The hydroponic dosing system of claim 1, wherein the processor is capable of receiving input from, instructing, regulating, adjusting, and/or sending one or more commands to one or more of the one or more sensors, a light, a humidifier, a dehumidifier, a fan, an air conditioner, a heater, a pump, a valve, an aerator, a CO2 dispenser, a moisture sensor, a leaf turgidity component, an irrigation system, and/or a camera.

19. The hydroponic dosing system of claim 1, wherein a pH adjuster and/or pH dispenser is capable of automatically adjusting pH and comprises one or more peristaltic pump capable of dispensing in response to measured pH values from a pH sensor.

20. The hydroponic dosing system of claim 1, wherein the mixing chamber further comprises one or more peristaltic pump capable of dispensing from one or more containers, wherein the amount and/or concentration dispensed depends on electrical conductivity readings.

21. The hydroponic dosing system of claim 1, wherein the processor is capable of adjusting the intensity, location, coverage, height, and/or wavelength of a light or light source.

22. The hydroponic dosing system of claim 1, wherein the mixing chamber is connected to one or more of the plurality of reservoirs, a water supply source, a pre-seeded growing tray, a pre-seeded growing table, a pre-seeded growing shelf, or a pre-seeded growing pod, wherein a liquid is capable of being pumped, sent, transferred, or circulated into the mixing chamber from one or more of the plurality of reservoirs, the water supply source, the pre-seeded growing tray, the pre-seeded growing table, the pre-seeded growing shelf, or the pre-seeded growing pod, wherein pH, temperature, and/or electrical conductivity readings are capable of being taken by the one or more sensors, wherein one or more of the readings determine an adjustment from an automated pH adjusting unit, the mixing chamber, and/or an automated nutrient dispensing unit, wherein the adjusted liquid is capable of being pumped, sent, transferred, or circulated back into one or more of the plurality of reservoirs, the water supply source, the pre-seeded growing tray, the pre-seeded growing table, the pre-seeded growing shelf, or the pre-seeded growing pod from which the liquid was received.

23. The hydroponic dosing system of claim 1, wherein the hydroponic growing system includes at least two separate reservoirs connected to at least two different growing zones designated for one or more plant varieties.

\* \* \* \* \*